Nov. 9, 1948.   C. G. McKEOWN   2,453,447
FILTER FOR GASEOUS MEDIUMS
Filed Jan. 24, 1945
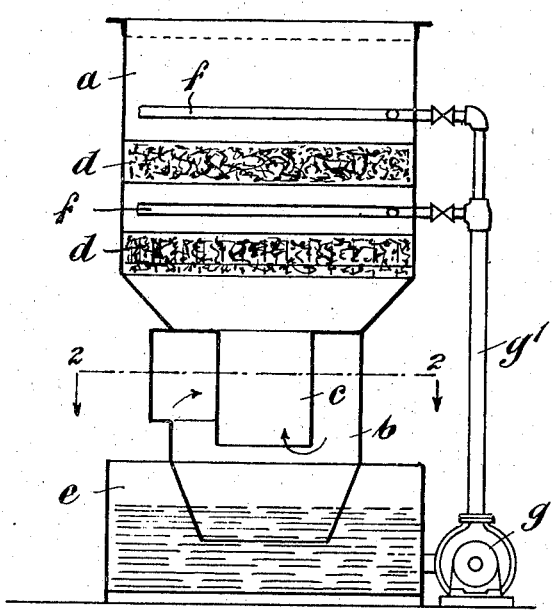
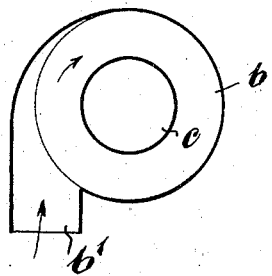
Charles George McKeown
Inventor
by Marshall & Marshall
Attorneys Patented Nov. 9, 1948

2,453,447

UNITED STATES PATENT OFFICE 2,453,447

FILTER FOR GASEOUS MEDIUMS

Charles George McKeown, Dudley, England, assignor to Controlled Heat & Air Limited, Smethwick, England, a British company Application January 24, 1945, Serial No. 574,226
In Great Britain February 1, 1944

1 Claim. (Cl. 183—16)

This invention has reference to improvements in filters for gaseous mediums, more particularly filters of the wet type which are utilised for the cleansing and washing of air or other gaseous mediums from which it is desired to extract or precipitate dust or other foreign particles before the air or other gaseous medium is released to atmosphere or for use in a predetermined manner.

The object of the invention is to increase the efficiency and output of filters of this character, and to ensure that the air or other gaseous medium is thoroughly subjected to a cleansing process before being released from the filter chamber for utilization.

The invention consists of a filter for gaseous mediums, more especially a filter of the wet type, wherein means are provided for introducing a gaseous medium through a circuitous inlet path to the filter member or members superimposed upon said means, liquid means for sealing the base of the filter chamber, and means for ensuring a circulation of fluid through the filter.

A preferred means of carrying the present invention into practice will now be described with reference to the accompanying sheet of drawings, in which:

Fig. 1 is a sectional diagrammatic side elevation of a filter plant according to the present invention.

Fig. 2 is a sectional plan on line 2—2 of Fig. 1.

The filter comprises an upper chamber $a$ and a lower chamber $b$ interconnected by a central tube or passage $c$ through which the gaseous and liquid mediums can pass. The chamber $b$ is smaller in diameter than the superimposed or upper chamber $a$ in which upper chamber $a$ there is contained a plurality of porous filter pads or partitions $d$ which transversely extend across the chamber $a$ and form a porous filter medium through which the air or other gas to be washed or filtered must pass and through which the water or other cleansing fluid in circulation is also passed in a contra-flow direction to that followed by the gaseous medium.

The chamber $b$ is formed with a peripheral inlet $b1$ which tangentially extends into the chamber and peripherally surrounds the connecting tube or passage $c$ between the two chambers $a$ and $b$ so that the incoming air or gas to be filtered is subjected to a circuitous path within this chamber $b$ around the connecting tube or passage $c$ before the air or gas is emitted upwardly through the tube or passage $c$ into the chamber $a$. The direction of flow of the incoming air or gas is indicated by the arrows in Figs. 1 and 2.

The lower chamber $b$ extends downwardly into a water or fluid sealing tank $e$ which not only provides a supply reservoir for the fluid to be circulated through the filter, but also forms a precipitate tank for any dust or foreign particles which may be present in and are removed from the air or gas in the course of the filtration process.

In the upper chamber $a$ there are provided say two transverse pads or partitions $d$ formed of a filtering medium such as coke, broken brick, silicate fibres or other suitable material having such a porosity as is suitable to the nature of the air or gaseous medium and to the water or other liquid which is circulated therethrough to admit of the requisite speed of operation. Disposed above each of the pads or partitions $d$ within the upper chamber $a$ is a perforated spray outlet pipe $f$ having connection to a supply pipe $g1$ fed from a circulating pump $g$ which draws its fluid supply from the tank or reservoir $e$ at a point substantially above its lowest fluid level beyond a weir located in the tank or reservoir so that the necessary circulation of fluid obtains from the spray emission in the upper chamber $a$ through the porous pads or partitions $d$ down the connecting tube or passage $c$ into the liquid in the tank $e$ which seals the bottom outlet from the lower chamber $b$. The liquid also forms a circulating medium for cleansing the air or other gaseous medium which is passed upwardly from its initial circuitous path through the connecting tube or passage $c$ into the upper compartment of the chamber $a$ from which it is emitted to atmosphere or other location. This circulating liquid medium thus forms an annular curtain between the base of the connecting tube or passage $c$ and the surface of the sealing liquid in the tank or reservoir $e$ through which the turbulent gaseous medium emitted from the circuitous path must pass in its upward passage to the filter pads or partitions $d$, and this tortuous gaseous medium serves to impart to the circulating liquid medium at its annular section a whirling action which tends to a more intimate contact between the gas and the liquid and a greater efficiency in the filtration.

The filter can be arranged to work either under pressure or by means of a vacuum, and it will be appreciated that as the air or gas is emitted from the lower chamber $b$ into the upper chamber $a$ it expands and passes at a greatly reduced velocity through the porous pads or partitions $d$ by means of which the cleansing operation due to the use of the contra-flow sprayed water or liquid is effected.

It is further to be appreciated that the efficiency of the apparatus is increased by causing the air or gas to circulate upon entering the filter and before coming into contact with the cleansing liquid, and that this circulation of the air or gas serves to precipitate any relatively heavy dust particles or foreign matter into the settling tank or reservoir due to centrifugal action and gravity, thereby reducing the dust or other solid content of the air or gas before coming into contact with the contra-flowing cleansing liquid.

By providing a spraying device above each of the porous filter pads or partitions there is provided a curtain of liquid within the upper chamber which forms the liquid cleansing medium for the air or gas passing therethrough, and by this means an intimate contact or association is obtained between the cleansing liquid and the incoming air or gas.

I claim:

In an apparatus of the class described, in combination, a gas-washing chamber, a horizontal porous partition extending across the chamber, means for distributing liquid with substantial uniformity upon the partition, a central inlet into the bottom of the chamber having a horizontal cross-sectional area which is substantially less than that of the partition, an open-bottom intake chamber that has a tangential inlet and extends below and around the inlet of the gas-washing chamber, whereby the whirling gas in the intake chamber is forced to pass radially inward through a continuous annular curtain of liquid falling from the inlet of the gas-washing chamber, and a settling tank below the intake chamber, the walls of the intake chamber extending below the liquid level in the settling tank.

CHARLES GEORGE McKEOWN.

REFERENCES CITED

The following references are of record in the file of this patent:

UNITED STATES PATENTS

| Number | Name | Date |
|---|---|---|
| 844,312 | Bachman | Feb. 19, 1907 |
| 1,841,556 | Stelz | Jan. 19, 1932 |
| 2,087,219 | Dorfan | July 13, 1937 |
| 2,095,539 | Bichowsky | Oct. 12, 1937 |
| 2,354,674 | Fisher | Aug. 1, 1944 |

FOREIGN PATENTS

| Number | Country | Date |
|---|---|---|
| 343,587 | Germany | Nov. 4, 1921 |